(No Model.)
P. M. PIERSON.
DEVICE FOR PACKING AND SUPPORTING CUT FLOWERS FOR TRANSPORTATION.
No. 580,424. Patented Apr. 13, 1897.
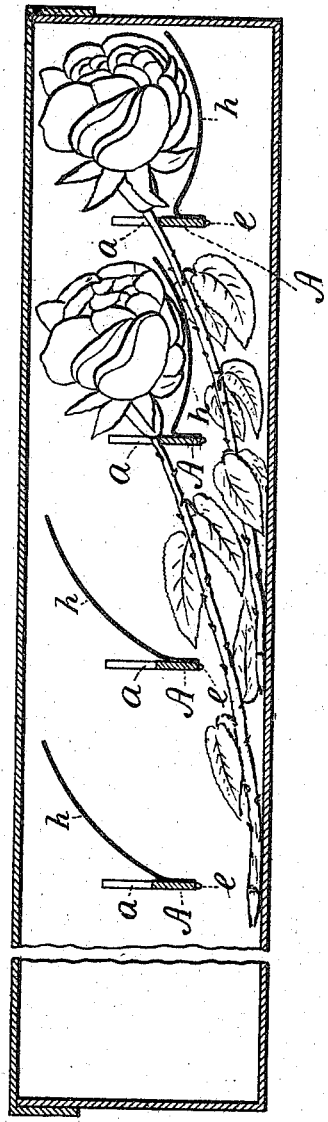
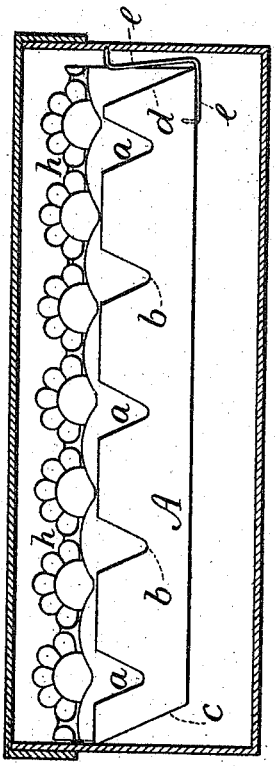
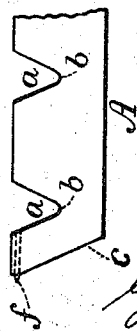
Witnesses:
J. Staib
Chas. H. Smith
Inventor:
Paul M. Pierson
by L. W. Serrell & Son
Attys

UNITED STATES PATENT OFFICE.

PAUL M. PIERSON, OF SING SING, NEW YORK.

DEVICE FOR PACKING AND SUPPORTING CUT FLOWERS FOR TRANSPORTATION.

SPECIFICATION forming part of Letters Patent No. 580,424, dated April 13, 1897.

Application filed August 21, 1896. Serial No. 603,498. (No model.)

*To all whom it may concern:*

Be it known that I, PAUL M. PIERSON, a citizen of the United States, residing at Sing Sing, in the county of Westchester and State of New York, have invented a new and useful Improvement in Devices for Packing and Supporting Cut Flowers for Transportation, of which the following is a specification.

Heretofore much difficulty has been experienced in packing and transporting cut flowers, especially roses, because the weight of the flowers, stems, and leaves in the layers, as the flowers are packed, largely comes upon the flowers, and the delicate petals of the flowers are liable to be injured by the pressure or the movement of the mass of flowers in the package or from the petals being bruised or torn in the case of roses by the thorns upon the stems or leaves.

The object of my invention is to provide a device whereby the flowers are supported and the weight of the packed layers is relieved therefrom, and in which device the flowers are evenly spaced, so as to prevent their rubbing against each other and to prevent the flowers from shifting their position in the receptacle after the same has been packed.

In carrying out my invention I employ strips of suitable material notched transversely at intervals, with one end of the strip pointed and the other end provided with a pointed spring. These strips are placed across between the sides of the box or receptacle in which the flowers are packed for transportation. They are held in place principally by the points at their respective ends engaging the box, the spring-point yielding slightly in case the sides of the box warp or bulge from internal pressure. These strips are put in position one at a time, and the notches each receive the flower-stem just behind the base of the flower, while the lower end of the stem rests upon and trails along the bottom of the box and the flower is supported without surrounding pressure. One strip at a time with its row of flowers and layer of stems is put in place until the packing of each receptacle for shipment is complete. In connection with these strips I prefer to employ a strip of paper considerably wider than the strip and preferably secured thereto by suitable adhesive material, the object of said strip of paper being to receive upon it the flowers as they are laid in rows in the notches of the strips, the pieces of paper coming between the flowers and the stems to prevent the flower-petals being scratched or bruised by the stems or leaves beneath.

In the drawings, Figure 1 represents a cross-section of a box or receptacle and an elevation of my improvement. Fig. 2 is a vertical section longitudinally of the box, showing a couple of layers of flowers and their stems; and Fig. 3 is a detached view of one end of one of said strips.

The strips A comprising my improvement are made of any desired length and depth and of any desired and suitable material and thickness. I, however, prefer to make the same of wood, as the least expensive material, and each strip is alike and is notched at $a$ transversely in the upper edge, the notches being preferably of a V shape with a rounded base, as at $b$. These notches are made at regular and suitable distances apart. One end of the strip is inclined from the pointed top edge downward and inward, as at $c$, and the other end is notched from the top edge downward and outward, as at $d$, and I employ a spring $e$, preferably of wire and pointed, and in the same plane as the strip, the base of the spring having an upturned point to enter the under edge of the strip. The under edge of the strip preferably partially receives the base member of the spring, and the upright member of the spring has an outwardly-bent and pointed end to engage the inner surface of the box or receptacle, the strip being held and supported by the points at the respective ends, and any tendency of the sides of the receptacle to bulge outward, such as in warping, is provided for by the action of the spring $e$, the same yielding to accommodate variations in the width of the box.

In Fig. 1 the end $c$ of the strip is shown in contact with the side of the box, but to insure said pointed end maintaining its position against the side of the box I prefer to employ a pointed wire introduced into the material of the strip, as shown in Fig. 3. I prefer also to employ strips of paper $h$, which are connected along one edge to one face of the strips and are wider but as long as the strips, and for appearance it is desirable that this paper should be of the character known as "lace-paper."

The notches $a$ each receive the stem just behind the base of the flower. The stem trails along and rests upon the bottom of the box or receptacle, and the flower is supported without surrounding pressure resting upon the strip of paper, as shown in Fig. 2, in which position the strip of paper comes between the flowers and the stems and leaves beneath, so that the delicate petals of the flowers are not injured by the stems or leaves or by thorns upon the stems or leaves, which would exist in roses.

One strip at a time with its row of flowers and layer of stems and leaves is put in place, the position of each strip being largely governed by the size of the flowers and the thickness of the stems, until the packing of each receptacle for shipment is complete.

I claim as my invention—

1. As a new article of manufacture, a device for packing and supporting cut flowers for transportation consisting of a strip notched in its upper edge and having points at its respective ends to engage the inner surfaces of the case or package, substantially as set forth.

2. As a new article of manufacture, a device for packing and supporting cut flowers for transportation consisting of a strip having transverse V-shaped notches in its upper edge with rounded bases with one pointed end inclined downwardly and inwardly and the other end inclined downward and outward and a wire spring whose base is connected to the strip and whose free end is turned outward and pointed, substantially as and for the purposes set forth.

3. As a new article of manufacture, a device for packing and supporting cut flowers for transportation consisting of a strip notched in its upper edge and having points at its respective ends to engage the inner surfaces of the case or package and having attached thereto along one edge a strip of paper which agrees in length with the strip and is preferably wider than the strip, substantially as and for the purposes set forth.

Signed by me this 14th day of August, 1896.

PAUL M. PIERSON.

Witnesses:
GEO. T. PINCKNEY,
HAROLD SERRELL.